United States Patent
Wesley

(12)
(10) Patent No.: US 6,490,623 B1
(45) Date of Patent: Dec. 3, 2002

(54) SYSTEM, METHOD AND COMPUTER READABLE CODE FOR ENCAPSULATING SYSTEM, LANGUAGE AND DEVICE INDEPENDENT COMMUNICATIONS SOCKET FUNCTIONALITY IN A LIGHTWEIGHT UNIFORM COMMUNICATIONS OBJECT MODEL

(75) Inventor: Ajamu Akinwunmi Wesley, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/138,916

(22) Filed: Aug. 24, 1998

(51) Int. Cl.⁷ .................. G06F 15/16; G06F 15/173
(52) U.S. Cl. ............... 709/227; 709/222; 709/231; 709/238; 709/250; 709/302
(58) Field of Search .................. 709/203, 202, 709/223, 227, 230, 231, 248, 315, 228, 316, 220, 219, 302, 250, 222; 707/103; 717/1

(56) References Cited

U.S. PATENT DOCUMENTS

| 5,546,584 | A | * | 8/1996 | Lundin et al. ............... 709/315 |
|---|---|---|---|---|
| 5,737,607 | A | * | 4/1998 | Hamilton et al. ........... 709/316 |
| 5,860,004 | A | * | 1/1999 | Fowlow et al. ................ 717/1 |
| 5,862,328 | A | * | 1/1999 | Colyer ........................ 709/203 |
| 6,021,067 | A | * | 1/2000 | Sarkar ........................ 707/103 |
| 6,260,077 | B1 | * | 7/2001 | Rangarajan et al. ........ 709/328 |
| 6,314,459 | B1 | * | 11/2001 | Freeman ..................... 709/220 |
| 6,343,318 | B1 | * | 1/2002 | Hawkins et al. ............ 709/219 |
| 6,343,321 | B2 | * | 1/2002 | Patki et al. .................. 709/227 |
| 6,405,049 | B2 | * | 6/2002 | Herrod et al. .............. 455/517 |

* cited by examiner

Primary Examiner—Mark H. Rinehart
Assistant Examiner—Paul Kang
(74) Attorney, Agent, or Firm—Jeanine S. Ray-Yarletts; Marcia L. Doubet

(57) ABSTRACT

A technique, system, and computer program for encapsulating socket functionality in a uniform communications object model. This object model is system- and language-independent, and supports both synchronous and asynchronous I/O. Further, the object model functionality is lightweight and modular, enabling its use within devices having limited memory and storage capability. The functionality included in this model is based on the common denominator of functions provided in modem operating systems, which provide the capability for basic sockets support as well as support for threads. Use of this uniform communications object model enables porting an application across environments ranging from resource-constrained devices through servers.

15 Claims, 13 Drawing Sheets

300 Interfaces

301
  302
    304 305
    clientTransportSubLayer, filterClientTransportSubLayer:
      308 constructor:
        dataBrokerAssimilator &dataBrokerInitialOwner
        char * serverHostName
        unsigned short int portNumber

303
    306 307
    serverTransportSubLayer, filterServerTransportSubLayer:
      309 constructor:
        dataBrokerAssimilator &dataBrokerInitialOwner
        unsigned short int portNumber

320
  321 322
  streamDataBroker, logicalRecordDataBroker:
  323  constructer:
        SOCKET connection
        sockaddr_in remoteSocketAddress

324  transmit:
        char *buffer
        unsigned int bufferCapacity

325  assimilate:     [Note: only for logicalRecordDataBroker]
        char *buffer
        unsigned int bufferCapacity

326  registerDataAssimilator:
        dataAssimilator *dataBrokerUser

327  deRegisterDataAssimilator: No Parms.

328  multiplexed: BOOL multiplexedDB

FIG. 3B

340 ┌ dataBrokerAssimilator:
      │ 341  assimilate:
      │             dataBroker *connection

360 ┌ dataAssimilator:
      │ 361  assimilate:
      │             char *    buffer
      │             unsigned int bufferCapacity
      │
      │ 362  connectionTerminated:
      │             unsigned long int errorCode

380 ┌ multiplexedDataAssimilator:
      │ 381  assimilate:
      │             unsigned int dbID
      │             char *    buffer
      │             unsigned int bufferCapacity
      │
      │ 382  connectionTerminated:
      │             unsigned int dbID
      │             unsigned long int errorCode

SYSTEM, METHOD AND COMPUTER READABLE CODE FOR ENCAPSULATING SYSTEM, LANGUAGE AND DEVICE INDEPENDENT COMMUNICATIONS SOCKET FUNCTIONALITY IN A LIGHTWEIGHT UNIFORM COMMUNICATIONS OBJECT MODEL

BACKGROUND OF THE INVENTION

1. Field of the Invention

The present invention relates to computer communications, and deals more particularly with a technique, system, and computer program for providing a lightweight, system-independent and language-independent communications object model for use with TCP/IP communications. This model encapsulates low-level socket functions, and provides support for both synchronous and asynchronous input/output.

2. Description of the Related Art

The TCP/IP protocol (Transmission Control Protocol/Internet Protocol) is the de facto standard method of transmitting data over networks, and is widely used in Internet transmissions. TCP/IP uses the concept of a connection between two "sockets" for exchanging data between two computers, where a socket is comprised of an address identifying one of the computers, and a port number that identifies a particular service, or process, on that computer. The process identified by the port number is the process that will receive the incoming data for that socket. A socket is typically implemented as a queue by each of the two computers using the connection, whereby the computer sending data on the connection queues the data it creates for transmission, and the computer receiving data on the connection queues arriving data prior to processing that data.

TCP/IP is typically used in a client-server model of computing, where the machine at which the user requests information is referred to as the client, and the computer that locates the information and returns it to the client is the server. In the World Wide Web environment, the server is commonly referred to as a "Web server". The client-server model may be extended to what is referred to as a "three-tier architecture". This architecture places the Web server in the middle tier, where the added tier typically represents databases of information that may be accessed by the Web server as part of the task of processing the client's request. This three-tiered architecture recognizes the fact that many client requests are not simply for the location and return of static data, but require an application program to perform processing of the client's request in order to dynamically create the data to be returned. In this architecture, the Web server may equivalently be referred to as an "application server".

In order to exchange data across a network or Internet, a computer may act as a client, a server, or both, depending on the application running on the computer. Some communication functions are used only for the client role, other functions are used only for the server role, and yet others are used in both roles.

Establishing and maintaining end-to-end communications through one or more networks is an extremely complicated process. To insulate a programmer writing application software that will run in this environment from the underlying communication details, a number of vendors have developed prepackaged communications software with an interface that is accessible to an application program. These packages may alternatively be referred to as "libraries". An example is Windows Sockets, or "Winsock", from Microsoft Corporation. Winsock contains functionality to implement socket-based communications using TCP/IP on a computer running a Windows operating system. These communications functions are made available to the programmer through an Application Programming Interface ("API"). The programmer then invokes selected functionality from this package by coding a reference to the corresponding API in his application program. For a computer running the UNIX operating system, the Berkeley Software Distribution ("BSD") sockets programming interface is commonly used. In the object-oriented environment, a communications package referred to as "java.net" has been produced by Sun Microsystems for use with the Java programming language. ("Java" is a trademark of Sun Microsystems, Inc.) "java.net" is a class of communications methods for use with sockets-based connections.

These packages of communications functionality have been developed for specific operating systems, and for use with specific programming languages. "java.net", for example, is only usable from application programs written in the Java language. The commands (that is, the syntax with which a programmer requests communication functionality) in the Winsock API differ from the commands available in the BSD API. This difference is due (at least in part) to tailoring the implementations to run on particular operating systems. For example, while the BSD API includes a "close" command, the corresponding Winsock API command is "closesocket". Further, the differences between the BSD and Winsock API support for asynchronous input/output ("I/O") function significantly impacts the design of applications utilizing this function, such that a restructuring of the application is required in order to port from one operating system to another. Java itself does not provide support for asynchronous I/O. With the proliferation of low-end handheld and embedded devices, the cost of porting application designs to varied devices becomes more and more expensive.

In addition, the data structures used in the various libraries are not consistent, so that an application program compiled for one library cannot be executed on a machine where the underlying function is supplied by a different library implementation. The particular programming model around which an operating system is designed is also a factor in differing implementations within libraries. For example, in addition to the differences in asynchronous I/O discussed above, some versions of the Windows operating system use non-preemptive scheduling, while other operating systems use preemptive scheduling. The details of this distinction are beyond the scope of this discussion, but the significance of the distinction is that server functionality ( for example, the "blocking receive" function) must be implemented differently to properly accommodate each approach. Furthermore, some libraries provide rich functionality, while others are limited to basic requirements.

Further, an "all-or-nothing" approach to using a specific library is required. As devices capable of communicating over networks become smaller and smaller, the need for efficient and compact communications software becomes increasingly important. Handheld computers and other embedded devices, such as the PalmPilot, have limited memory and storage capacity, and may use specialized or device-specific operating systems for which no library of communications functionality is readily available. Such computers need access to a library providing basic communications functionality, without the overhead associated with advanced communications. ("PalmPilot" is a trademark of 3Com Corporation.)

For an application programmer, these operating system and programming language dependencies and differences mean that either one version of his application will be created, for a particular operating system or language (restricting the market for his software), or that he must implement different executable versions of the application for each operating system and programming language environment (with a corresponding increase in the cost and effort required for development and support).

Accordingly, a need exists for a technique by which these disadvantages in the current implementations of socket functionality can be overcome. The proposed technique defines a lightweight uniform communications model to encapsulate this functionality. The model is system and language-independent, and supports both synchronous and asynchronous I/O. The functionality included in this model is based on the common denominator of functions provided in modem operating systems, which provide the capability for basic sockets support as well as support for threads.

SUMMARY OF THE INVENTION

An object of the present invention is to provide a technique for encapsulating low-level socket functionality.

Another object of the present invention is to provide a technique whereby this functionality is system- and language-independent.

It is another object of the present invention to provide a technique whereby this functionality supports both synchronous and asynchronous I/O.

It is a further object of the present invention to provide a technique whereby this functionality is lightweight and modular, enabling its use within devices having limited memory and storage capability.

It is yet another object of the present invention to provide a communications object model that provides uniform communications functionality which can be implemented in, and ported across, environments ranging from resource-constrained devices through servers.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer-readable code implementing a software process for use in a computing environment having a connection to a network, for encapsulating socket functionality in a lightweight uniform communications object model. This comprises a plurality of supplied user-invocable communications functions, each of the functions having a defined interface; a subprocess for receiving one or more invocations of any of the defined interfaces; and a subprocess for processing one or more logic routines in response to each of the invocations. Preferably, these functions are provided in a manner that is system-independent, language-independent, and device-independent; the functions include one or more functions supporting synchronous input/output and one or more functions supporting asynchronous input/output; and the model can be implemented in, and ported across, environments ranging from resource-constrained devices through servers. Preferably, a first of the interfaces enables use of a subprocess for creating a sublayer for client support and a second of the interfaces enables use of a subprocess for creating a sublayer for server support; a third of the interfaces enables use of a subprocess for creating one or more data brokers, wherein each of the data brokers may operate on a stream of data or on one or more logical records of data; a fourth of the interfaces enables use of a subprocess for creating one or more data broker assimilators, wherein each of the data broker assimilators assimilates one or more data brokers; a fifth of the interfaces enables use of a subprocess for creating one or more data assimilators, wherein each of the data assimilators provides a subprocess for data assimilation and provides a subprocess for notification of connection termination; a sixth of the interfaces enables use of a subprocess for creating one or more multiplexed data assimilators, wherein each of the multiplexed data assimilators provides a subprocess for data assimilation for data arriving on more than one connection, and provides a subprocess for notification of connection termination of the more than one connection.

The present invention will now be described with reference to the following drawings, in which like reference numbers denote the same element throughout.

BRIEF DESCRIPTION OF THE DRAWINGS

FIG. 3A illustrates the interfaces to the functionality of the uniform communications object model;

FIG. 3B illustrates the assimilator interfaces to the functionality of the uniform communications object model.

DESCRIPTION OF THE PREFERRED EMBODIMENT

Figure 1:
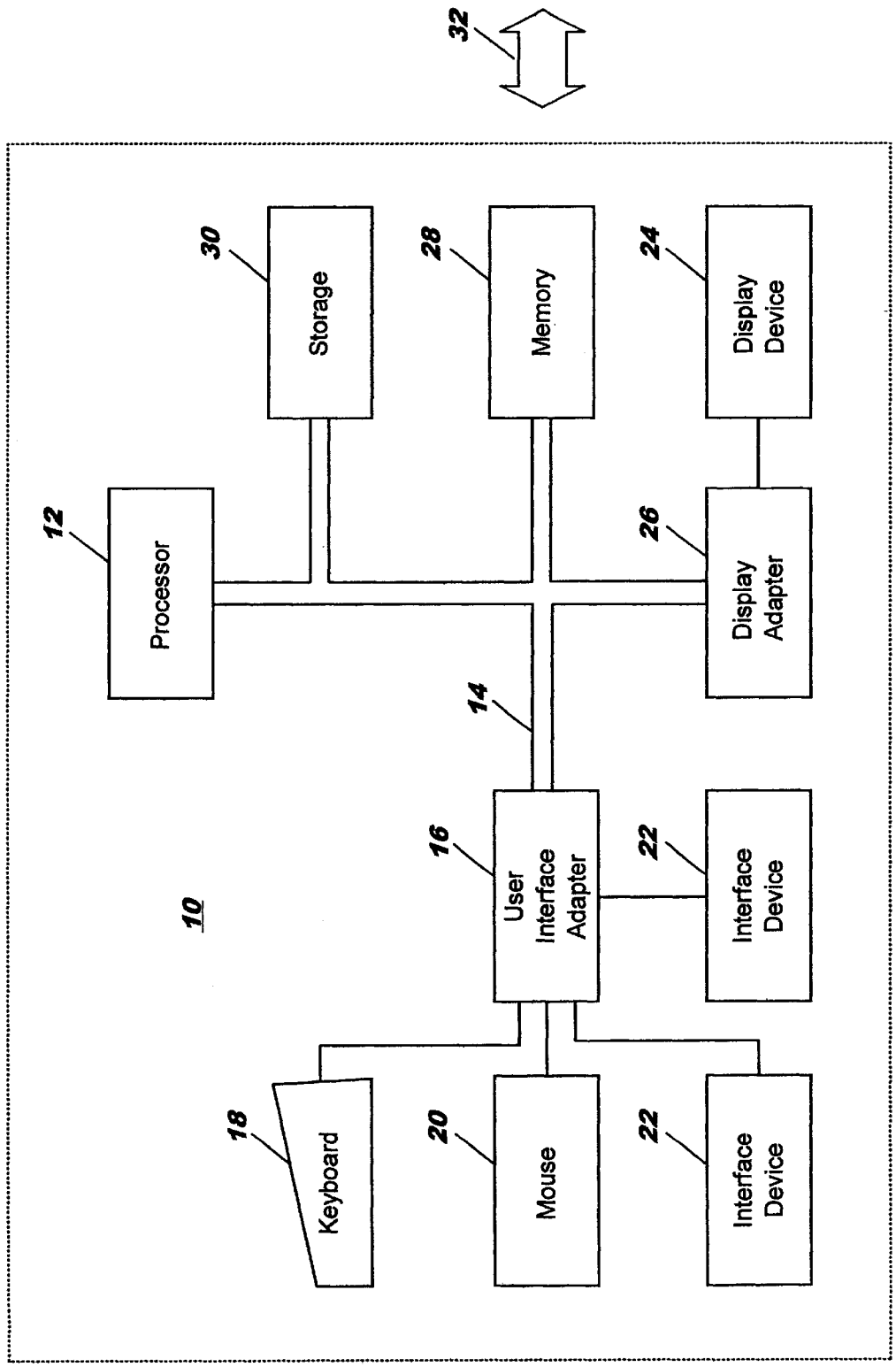
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 may alternatively represent a server in a networked environment. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 communicates via a communications channel 32 with other computers or networks of computers. The workstation 10 may be associated with such other computers in a local area network (LAN) or a wide area network, or the workstation 10 can be a client in a client/server arrangement with another computer, etc. All of these configurations, as well as the appropriate communications hardware and software, are known in the art.

Figure 2:
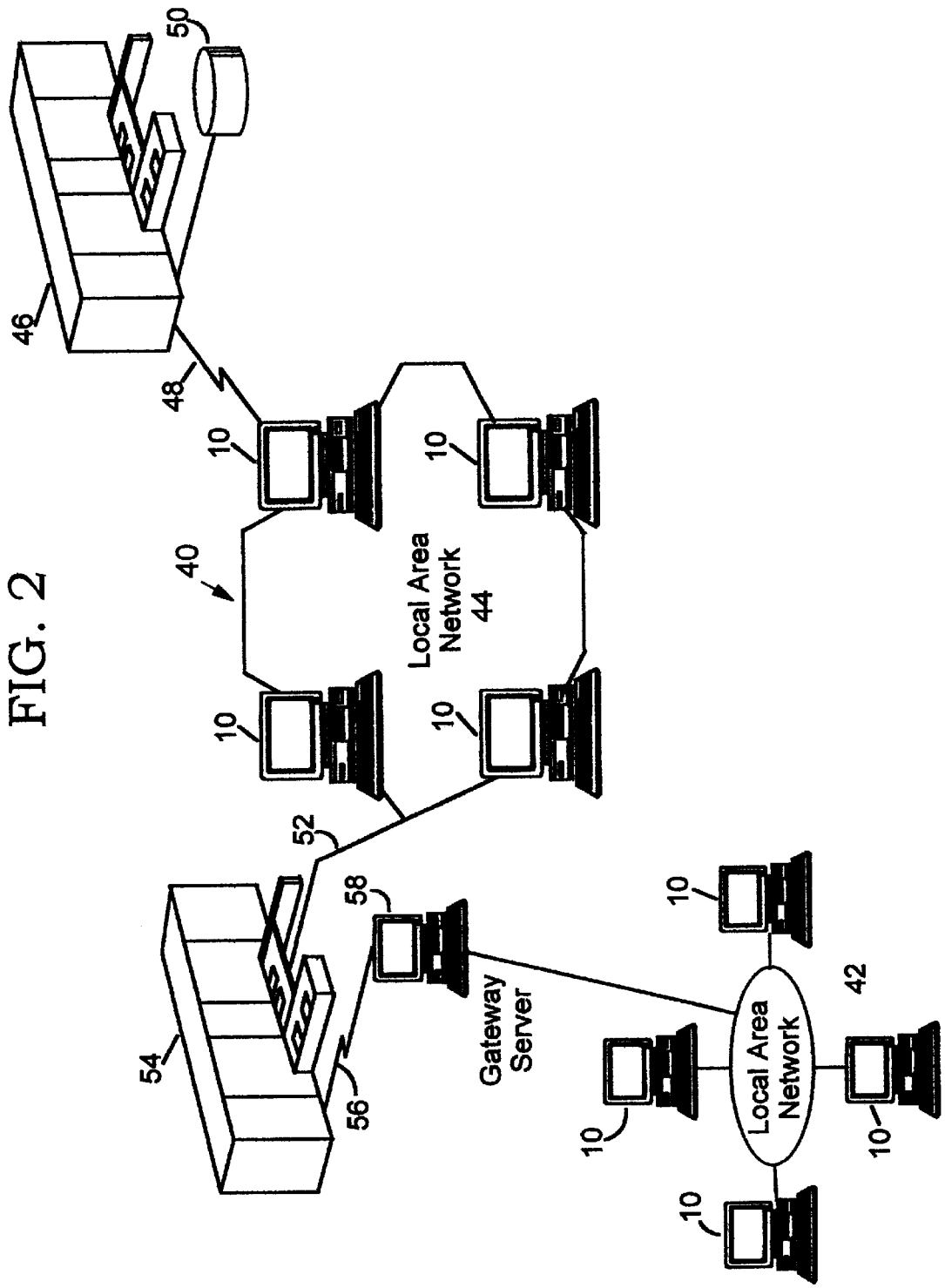
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers or servers, such as a mainframe computer 46, which may be preferably coupled to the LAN 44 by means of a communications link 48. The mainframe computer 46 may be implemented utilizing an Enterprise Systems Architecture/370 or an Enterprise Systems Architecture/390 computer available from IBM, or any other type of mainframe computer. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention will typically be installed in a client such as workstation 10, and in a server such as server 46 in a client-server or three-tiered environment. The code will be typically be embodied in the memory 28, and accessed by the microprocessor 12 using the bus 14. Alternatively, the code may be accessed from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. The techniques and methods for embodying software programming code in memory, on physical media, and/or distributing software code via networks are well known and will not be further discussed herein.

The preferred embodiment of the present invention will now be discussed with reference to FIGS. 3 through 7.

In the preferred embodiment, the present invention is implemented as a library of computer software classes or modules. This library will be installed on a computer functioning as a client or as a server, or both. Typically, the client and server will be running in an Internet environment. Alternatively, the client and server may connect using a single network, or a corporate intranet (that is, a network owned or managed internally to the user's company), where this corporate intranet provides services in a similar manner to the Internet. The terms "network" and "Internet" are used synonymously hereinafter, and include processing that occurs in an intranet, unless otherwise stated. The program code of the preferred embodiment may be implemented as objects in an object-oriented programming language such as C++, or as functions or subroutines of a conventional procedure-oriented programming language such as C.

FIG. 3 illustrates the interfaces to the uniform communications object model, which dictate how an implementation may access the functionality encapsulated within the object model. As stated previously, a common API to the object model is provided, regardless of the operating system, language, or device in which the model is implemented. This enables applications programmers to write their applications once, using a single set of communication functions which will be supported across a wide variety of platforms.

As shown in FIG. 3, the API is organized into five different modules, or classes. In C++ terminology, these modules are "abstract base classes"; in Java, they would be referred to as "interfaces". These are: (1) the sublayer module 301; (2) the dataBroker module 320; (3) the dataBrokerAssimilator module 340; (4) the dataAssimilator module 360; and (5) the multiplexedDataAssimilator module 380. Each of these will now be discussed in more detail.

The sublayer module 301 is responsible for building the socket connections. This module is further divided into subclasses 302 for client functions, and 303 for server functions, having concrete classes 304, 305, 306, and 307. When the client implementation invokes the "constructor" function 308(see FIG. 4 and accompanying text), a client transport sublayer is allocated. This sublayer spawns a connection thread, and then attempts a connection to the specified hostname and port number (using the "serverHostName" and "portNumber" input parameters). When the server implementation invokes the "constructor" function 309(see FIG. 5 and accompanying text), a server transport sublayer is allocated. This sublayer also spawns a connection thread, which builds a server socket, binds it to a specified port (using the "portNumber" input parameter), and blocks waiting to accept incoming connection requests. Both constructor functions also have as an input parameter a reference to a dataBrokerAssimilator (discussed below), which initializes the client or server (as appropriate) as being the initial owner of the dataBroker (i.e. of the connection) that is created. The threads used by the client and server are dedicated threads, to avoid locking up the implementation with blocking socket calls (such as "connect" and "accept").

Two different types 304 and 305 of client transport sublayer 302, and two types 306 and 307 of server transport sublayer 303, are defined. Applications which tend to act as "filters" may use the interfaces to the "filterClientTransportSubLayer" ("FCTSL") 305 and "filterServerTransportSubLayer" ("FSTSL") 307 classes. These classes use strewn-oriented data transmit and receive messages, instead of logical record-oriented transmit and receive. This is further discussed below with reference to the "streamDataBroker" 321 and "logicalRecordDataBroker" 322 classes. These interfaces 305 and 307 may also be used by applications which do not have a compatible peer dataBroker 320 class. That is, if one side of the connection supports logical record handling, while the other side supports only stream data, instances of the FCTSL and FSTSL classes will be used and communications between them will occur using stream-oriented messaging.

Alternatively, the "clientTransportSubLayer" ("CTSL") 304 and "serverTransportSubLayer" ("STSL") 306 classes are used for applications which handle data as logical records. Both the client and the server must use these classes, operating as a pair.

The dataBroker module 320 represents the connection itself. An instance of this class is created by the sublayer 301 modules during the connection establishment process. This module 320 is subclassed by the "streamDataBroker" ("SDB") concrete class 321, which in turn is subclassed by the "logicalRecordDataBroker" ("LRDB") concrete class 322. A streamDataBroker operates on bytes as a data stream, and does not ensure maintenance of the logical record boundaries. An LRDB, on the other hand, operates on the bytes as logical records, and does maintain the record boundaries. For example, a client may transmit 2 packets of 100 bytes each. If each of these packets is a logical record, the LRDB receiver will reconstruct the 2 packets by parsing the data stream. However, the SDB receiver may return any number of bytes, from a single byte to the entire 200-byte stream, in response to a call for data.

An SDB 321 and an LRDB 322 are both dataBrokers 320, and support the interfaces 323, 324, 325, 326, 327, and 328 that are defined for dataBrokers 320. This interface includes methods for creating 323 the dataBroker (either an SDB or an LRDB), transmitting 324 and assimilating 325 data, as well as for registering 326 and deregistering 327 dataAssimilators, and monitoring the connection status 328. The first of these interfaces is the "constructor" method 323, which is invoked to create a dataBroker instance. Instances of the CTSL 304 and STSL 306 classes invoke this method on the LRDB class 322, and instances of the FCTSL 305 and FSTSL 307 classes invoke it on the SDB class 321. This function takes as input parameters the socket for which the dataBroker is to be created, and the remote socket address. The "transmit" interface 324 is used to send data, and takes as input parameters a pointer to the buffered data (which is a stream when invoked on an SDB instance, and a logical record for an LRDB instance) to be sent, and an integer specifying the length of that data. The "assimilate" interface 325 is used to receive data (for an LRDB only, as indicated in FIG. 3A), and has as input parameters a pointer to a buffer in which the data is to be assimilated, as well as an integer value specifying the maximum length (capacity) of that buffer. A dataAssimilator is registered with an SDB or an LRDB using the "registerDataAssimilator" interface 326, which takes as a parameter a pointer to the dataAssimilator instance that is registering itself as a user of the dataBroker. A dataAssimilator is "deregistered" by using the "deRegisterDataAssimilator" interface 327(without parameters). The interface 328 used for monitoring data is "multiplexed", which takes a Boolean parameter indicating whether this dataBroker is multiplexed.

An LRDB also acts as, and inherits from, dataAssimilator 360 (described below). Thus, an LRDB supports the assimilate interface 361.

Each instance of the SDB subclass uses a dedicated thread, in order to facilitate asynchronous delivery of data and notification of connection status. Each instance of the LRDB subclasses reuses the thread of the SDB from which it inherits, so that both the SDB and LRDB instances may share access to the same data. By using a dedicated thread for the blocking receive function in the SDB, the blocking can be localized to the SDB function. The other threads, such as those used for dataAssimilators to perform application-specific functions, can continue processing without having to block. The SDB's thread will be awakened when either data is received, or the connection terminates. At that time, the SDB sends an asynchronous notification to its dataAssimilator, which will then be processed by that thread.

By abstracting the dataBroker class 320, support can be provided for both synchronous and asynchronous communications, without creating dependencies on an operating system, a programming language, or a specific device.

In order to isolate the functionality required for transmitting and assimilating data from the function which creates the client and server instances and establishes the connection between them, as the client 302 and server 303 sublayers are created they delegate responsibility for their connection to a dataBrokerAssimilator ("DBA") 340. This occurs during processing of the "constructor" calls of the client and server, where a DBA 340 is notified that it should own the dataBroker just created. This notification occurs through invocation of the DBA's "assimilate" method 341, which receives a pointer to the dataBroker 320. However, the DBA 340 is not limited to retaining ownership of the same dataBroker instance indefinitely: the dataBroker may instead float from one DBA to another. Ownership of a dataBroker requires holding a pointer to it. Thus, one owner may pass the pointer to another object, enabling that object to become the new owner. Any object in the system that wants to receive a dataBroker can be a DBA in this manner The owner is responsible for deleting the DBA upon terminating the application processing.

While a single interface 341 is defined for the DBA 340 in the preferred embodiment, more complex functionality may be added by defining additional interfaces, as required by a specific application. For example, if a connection requires authentication, an "authenticate" interface can be provided. When invoked, the underlying code for this interface will then perform the authentication function using data supplied as one or more parameters. Similarly, a "negotiation" interface can be provided, which performs negotiation function. As an example of how these functions use a DBA, the authenticator function may hold the dataBroker while authentication is being done, and then pass the dataBroker to the negotiator function to perform negotiation and/or capabilities exchange. The negotiator function may then pass the dataBroker to another object according to the needs of the application.

By abstracting the DBA module 340(and the dataAssimilator module 360, discussed below), client/server functions can utilize the communications object model of the present invention without regard to the specific application for which the client/server code was written.

The dataAssimilator ("DA") interface 360 allows for notification of data reception and of connection termination. The "assimilate" interface 361 is called by a dataBroker 320 (either an SDB or an LRDB) when data is received and ready for processing, provided that a DA is registered for that dataBroker. The command requires two input parameters, a pointer to the buffer in which the received data is stored, and an integer specifying the length of that data buffer. The "connectionTerminated" interface 362 is also called by a dataBroker 320, to notify the DA that the underlying connection has terminated. This interface uses one parameter, which is an integer specifying an error code which may be associated with the termination.

A DA may register itself as being the DA for a dataBroker at any time, using the dataBroker's "registerDataAssimilator" interface 326 as described above. Similarly, the DA may unregister itself at any time, using the "deregisterDataAssimilator" interface 327. One DA may register itself when a DA is already registered, enabling the dataBroker to float between dataAssimilators as required by the application (or other object) which will invoke these calls. For example, if a first process within an application needs access to the connection's data, it will register as the DA. When that process no longer needs data, but a second process does, then the second process will register as the DA (and the first process may or may not have deregistered in the interim). In order to adapt to this dynamic registration of dataAssimilators, the dataBroker checks prior to each invocation of a DA's method (i.e. before invoking "assimilate" 361 or "connectionTerminated" 362 on a DA).

The multiplexedDataAssimilator ("mDA") module 380 inherits from dataAssimilator 360, and provides the same role (notification of received data and of connection termination). The difference between a DA 360 and a multiplexedDataAssimilator 380 instance is that the latter is capable of supporting reception of data from more than one dataBroker 320, whereas a DA supports a single dataBroker. Thus, the mDA interface 380 requires an extra parameter for both methods 381 and 382, which is the dataBroker identification ("ID") from which the data was received or which is terminating the connection, respectively. This will be particularly useful for applications which receive data for multiple sockets.

FIGS. 4–7 illustrate flow charts which set forth the logic with which a preferred embodiment of the present invention may be implemented.

Figure 4:
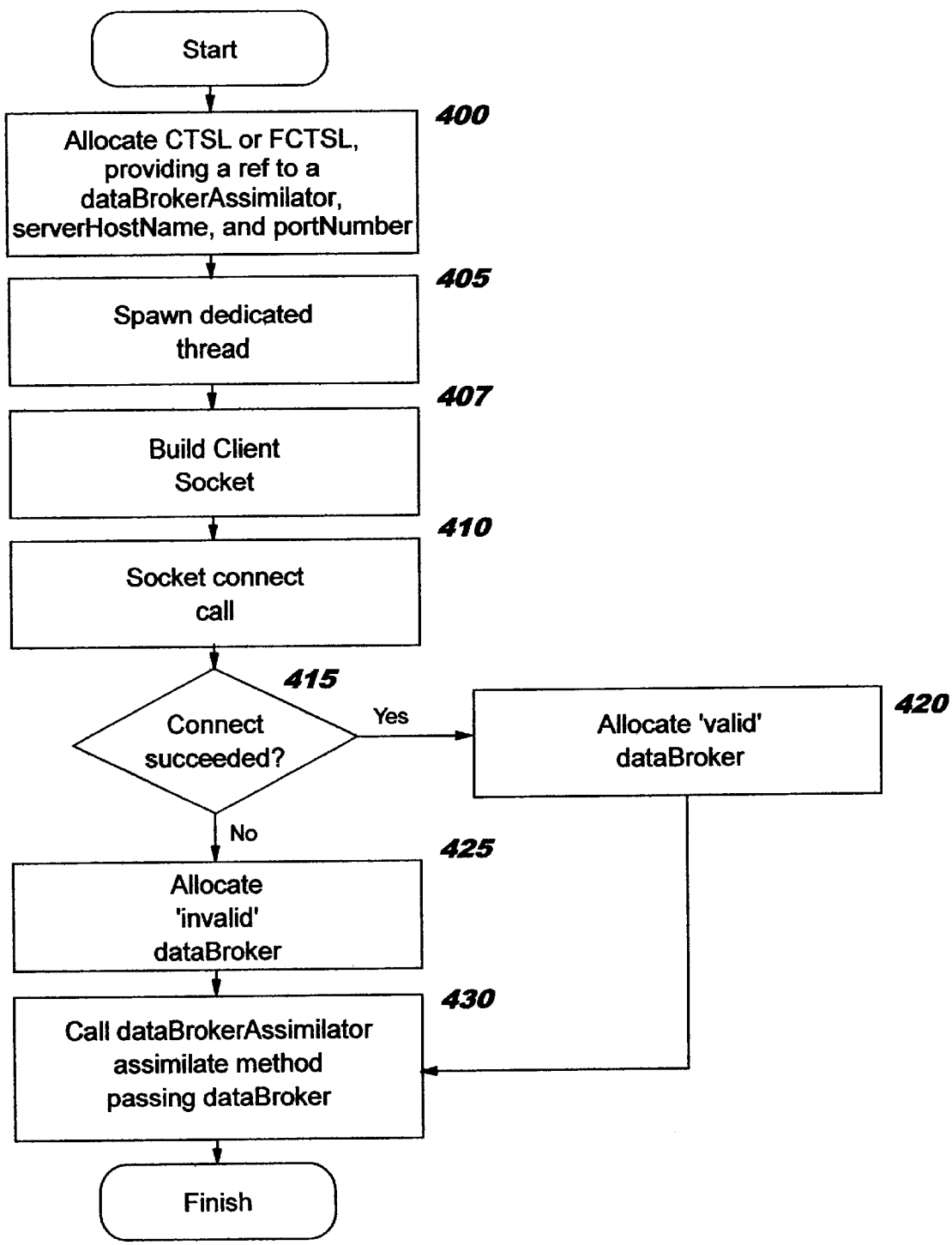
FIGS. 4, 5, 6A, 6B, 6C, 6D, 7A, 7B and 7C illustrate flow charts which set forth the logic of a preferred embodiment of the present invention.

FIG. 4 depicts the logic of the client sublayer, showing the process that occurs upon invocation of the "constructor" function of the CTSL and the FCTSL classes by a client implementation. At Block 400, an instance of the client sublayer is allocated, using the input parameters which provide: (1) a reference to a dataBrokerAssimilator, (2) a server host name, and (3) a server port number. As stated previously, this dBA will be the owner of the connection for this client, once that connection is established. At Block 405, a dedicated thread is spawned for this client sublayer. Block 407 then builds a client socket. The socket connect call is invoked at Block 410, using the serverHostName and portNumber input parameters. The implementation of the connect call uses techniques which are known in the art and which do not form part of the present invention.

Block 415 tests to see whether the connect call invoked at Block 410 was successful. When this test has a positive response, Block 420 allocates a valid dataBroker for the connection. If the constructor method is invoked on the CTSL class, then an LRDB is allocated; otherwise, an SDB is allocated. This dataBroker will be used later during transmitting and receiving data for the connection, as discussed previously. Otherwise, if the connect failed, Block 425 allocates an "invalid" dataBroker for this connection. This is done in order to enable a DA, which is running as another asynchronous process, to determine that the client did not successfully establish a connection. When subsequent processing tries to access the dataBroker (e.g. using the transmit, registerDataAssimilator, or assimilate methods), the preferred embodiment will throw an exception indicating that there is an invalid dataBroker.

Following the allocation of the dataBroker in either Block 420 or 425, Block 430 calls the "assimilate" method for the DBA which is responsible for this client connection. This call provides a parameter which identifies this newly-allocated dataBroker, giving the DBA ownership of the newly-allocated dataBroker. The client's "constructor" process then ends.

Figure 5:
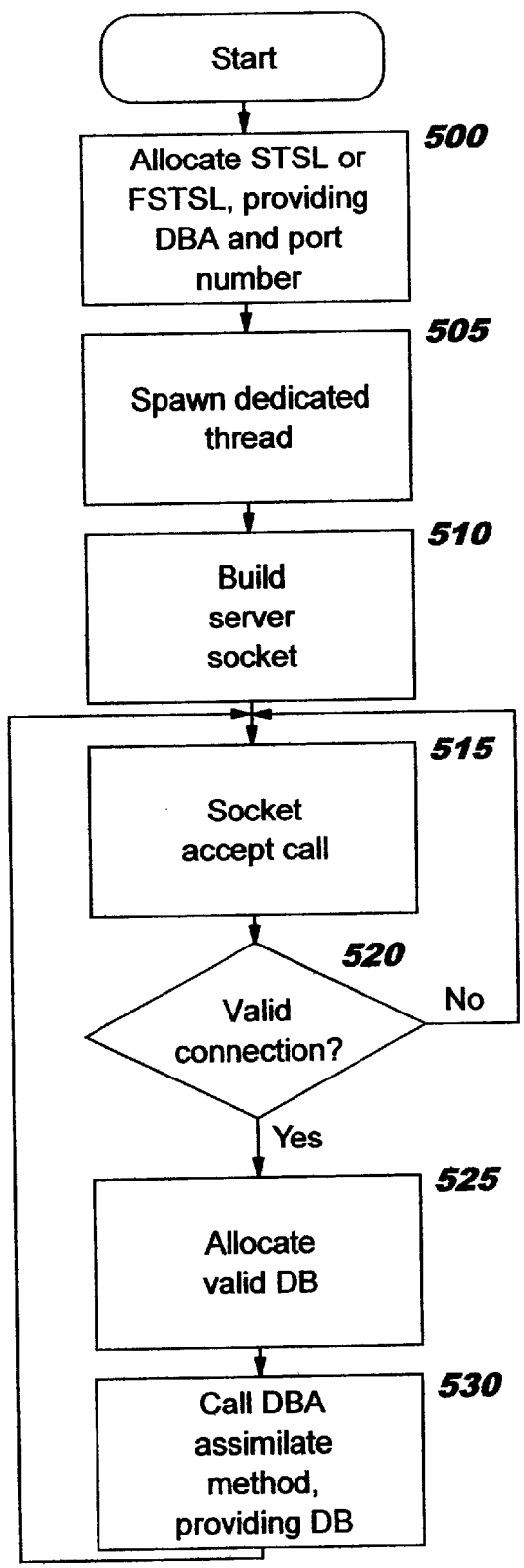

FIG. 5 depicts the logic of the server sublayer, showing the process that occurs upon invocation of the "constructor" function of the CTSL and the FCTSL classes by a server implementation. At Block 500, an instance of the server sublayer is allocated, using the input parameter which provides a reference to a DBA. As stated previously, this DBA will be the owner of the connection for this server, once that connection is established. At Block 505, a dedicated thread is spawned for this server sublayer. Block 510 builds the server socket to be used for this connection, and binds it to the port number specified as an input parameter. The socket accept call is invoked at Block 515. The implementation of the accept call uses techniques which are known in the art and which do not form part of the present invention.

Block 520 tests to see whether the a valid connection was accepted by the call invoked at Block 515. When this test has a negative response, control returns to Block 515 to wait for a valid connection to be completed. Otherwise, control transfers to Block 525 where a valid dataBroker (an SDB when invoked on an FSTSL instance, and an LRDB when invoked on an STSL instance) is allocated for the connection. This dataBroker will be used later during transmitting and receiving data for the connection, as discussed previously.

Following the allocation of the dataBroker in Block 525, Block 530 calls the "assimilate" method for the DBA which is responsible for this server connection. This call provides a parameter which identifies the dataBroker allocated at Block 525, giving ownership of this dataBroker to the DBA. The server's "constructor" process then ends.

FIGS. 6A–6D depict the logic of a logicalRecordDataBroker, which is created upon connection establishment by a CTSL and STSL instance. At Block 600, an instance of the LRDB class is allocated, using the input parameters specifying the socket and the remote socket address of the connection for which this LRDB will act as a dataBroker. At Block 605, a streamDataBroker is allocated by invoking the "constructor" method of the SDB class. The socket and remote socket address parameters which were passed as input to the LRDB's constructor method are used as input parameters when invoking the constructor method of the SDB class. A thread does not need to be spawned for this LRDB instance, as previously stated, because it reuses the dedicated thread of the SDB instance from which it is inheriting.

At Block 610, this LRDB instance registers itself as the dataAssimilator for the SDB by calling the SDB's "registerDataAssimilator" method and passing a pointer to this LRDB. The LRDB then waits for requests for service on the connection for which it is a dataBroker. Blocks 615, 630, and 685 handle the processing of these requests.

At Block 615, a test is made to see if the LRDB's "transmit" method has been called. When this test has a positive response, Blocks 620 and 625 handle transmitting the application's data. Otherwise, control transfers to Block 630.

Block 620 prepends a header to the application's data in preparation for transmission. This header specifies the length of the logical record, and will be used by the LRDB on the receiving side of the connection to determine the logical record boundaries when reconstructing the logical record. Block 625 then invokes the "transmit" interface of the SDB instance from which this LRDB inherits, passing a pointer to the buffered logical record (including the header prepended in Block 620) as well as the size value for the buffer. Control then returns to Block 615 to await the next request for LRDB function.

Block 630 tests to see if the LRDB's "assimilate" method has been called by the SDB for which it is a registered DA.

Figure 6A:
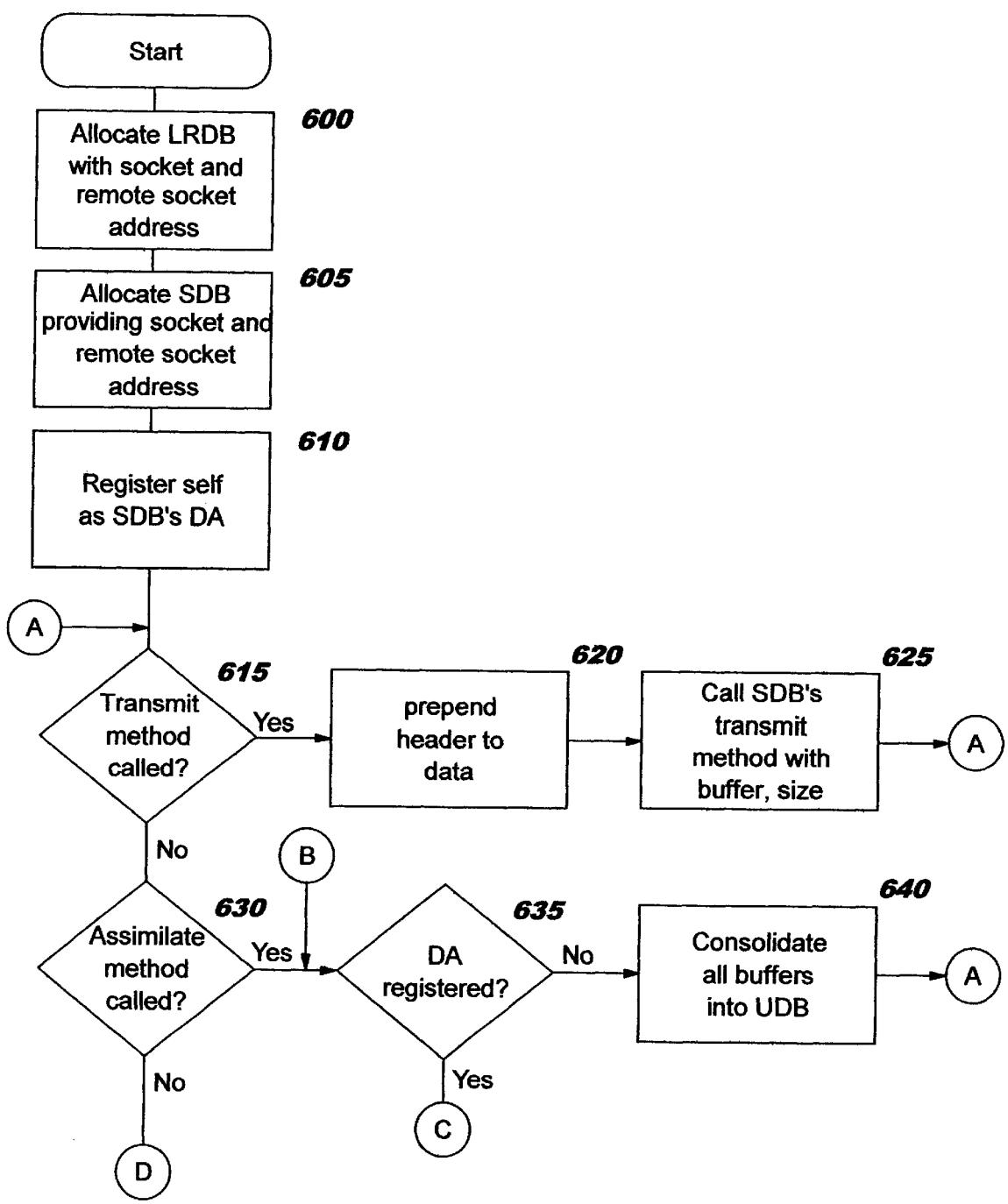
Figure 6B:
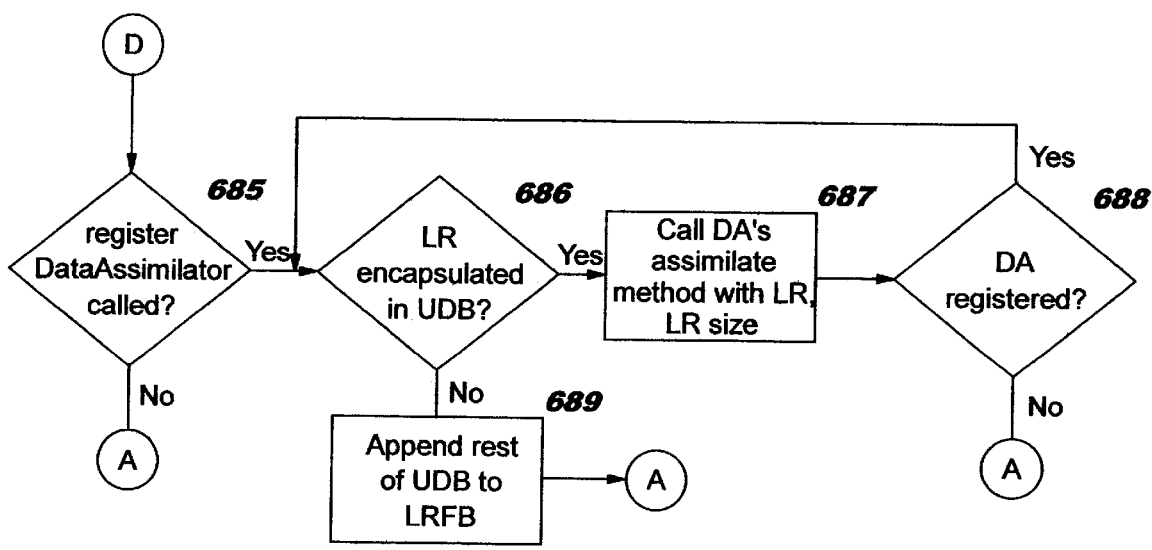
Figure 6C:
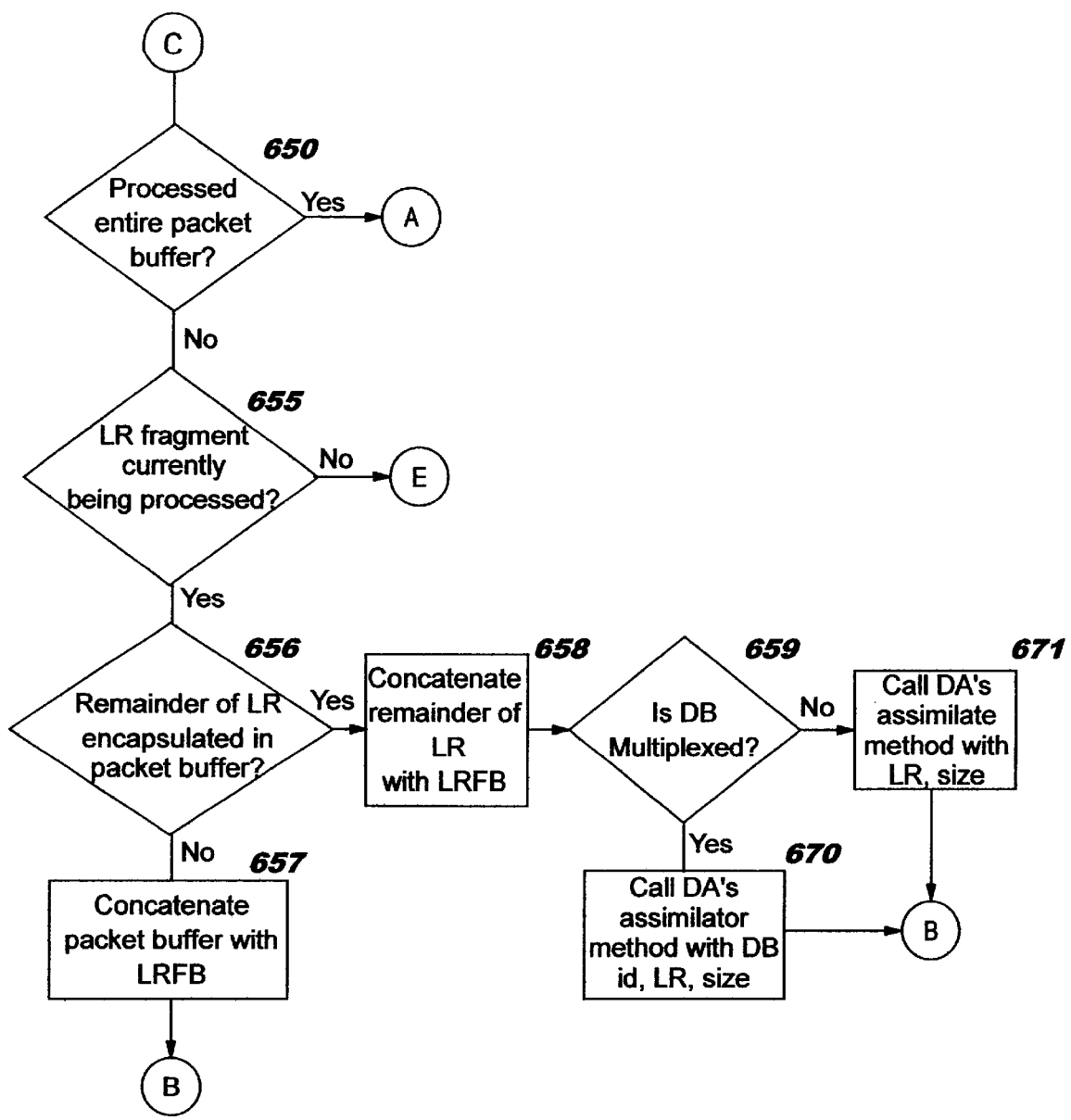

If not control transfers to Block 685 (see FIG. 6B). Otherwise, Blocks 635 through 680 (see also FIGS. 6C and 6D) process this call, which is an asynchronous notification from the SDB to its LRDB indicating that data has arrived on the underlying connection.

Block 635 asks if there is a dataAssimilator registered for this LRDB. If not, then the incoming data will be buffered until a DA is later registered (at which time the data will be sent to that DA using the process which begins at Block 685 of FIG. 6B). Block 640 performs this data buffering, by consolidating all buffered data (including the newly-arrived data from this assimilate call) into one "undeliveredDataBuffer", or "UDB". The preferred embodiment uses three logically-separate data buffers. The first is the UDB, into which data is stored when no DA is registered, as just described. The second is the "logical record fragmentation buffer", or "LRFB". Data is buffered here when logical records are being received, but only part of the logical record has been received so far. The third buffer is the packet buffer, from which the SDB receives data as it arrives on the connection. All three of these buffers are consolidated by the processing of Block 640. Control then returns to Block 615.

When there is a registered DA for this LRDB, the test at Block 635 has a positive response. Block 650 (see FIG. 6C) receives control, and begins the processing required to deliver the incoming data to that DA. Block 650 asks if the entire packet buffer has been processed that is, if the packet buffer is empty. When this test has a positive response, then there is no data to deliver, so control returns to Block 615. Blocks 655 through 680 (see also FIG. 6)) handle the processing when this test has a negative response (i.e. when there is more data in the packet buffer awaiting processing).

At Block 655, a test is made to determine if a logical record fragment is currently being processed. When this is true, the appropriate response is to continue buffering data until all the fragments making up the logical record have been assimilated. Blocks 656 through 671 accomplished this for the current fragment by concatenating the incoming data to the fragments which have already been buffered. At Block 656, a test is made to determine whether the incoming data in the packet buffer is the remainder of an LR. If not, Block 657 concatenates that data to the LRFB, and returns control to Block 635. Otherwise, Block 658 concatenates this remainder to the LRFB.

Block 659 checks to see if this LRDB is multiplexed—that is, if it sends its data to a multiplexed DA. When this test has a negative response, Block 671 then calls the "assimilate" method of the dataAssimilator for this LRDB, passing a pointer to the logical record and the length of the data buffer as input. Note that the DA for this LRDB is the application or other object which has registered itself as the LRDB's DA, and which will receive and process the incoming data currently being received on the connection. The manner in which this DA processes the data is application-dependent, and does not form part of the present invention. Control transfers to Block 635. When the test at Block 659 has a positive response, Block 670 calls the DA's assimilate method in a similar manner to Block 671; however, an additional parameter is passed to that multiplexed DA, which is the dataBroker ID for the connection on which the data was received.

Figure 6D:
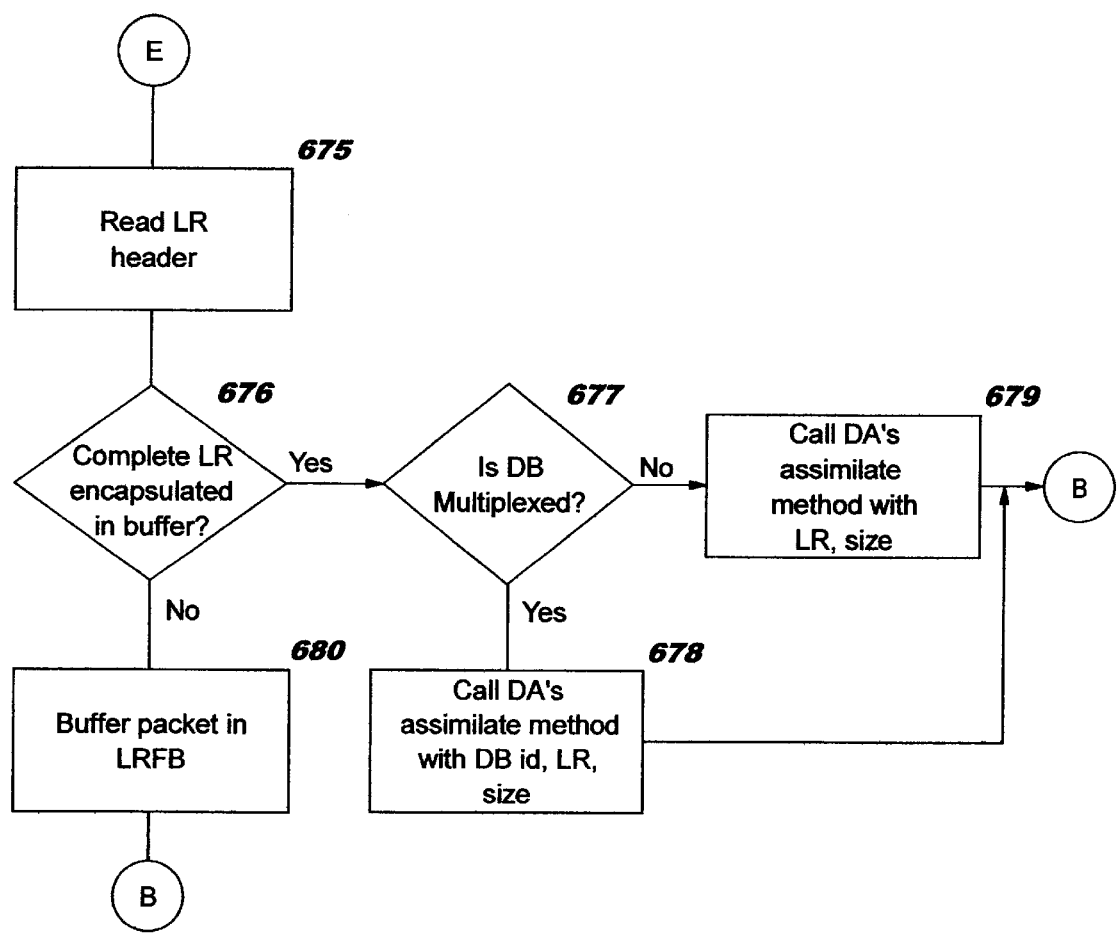

Block 675 of FIG. 6D is reached when the data currently being processed was not a logical record fragment Block 675 reads the logical record header (which was prepended to the record by the processing of Block 620 on the sending side of the connection). Based on the length value in this header and the length of the data in the packet buffer, Block 676 determines whether a complete logical record is encapsulated in the buffer. It will be obvious to one of ordinary skill in the art that when the length value in the header specifies a length less than or equal to the length of the data in the packet buffer, that the entire logical record is contained in the buffer. In that case, before sending the logical record, Block 677 checks to see if this LRDB is multiplexed. When this test has a negative response, Block 679 calls the DA's "assimilate" method with this complete logical record and its size, and control returns to Block 635. Otherwise, when the packet buffer contains only a partial logical record, Block 680 buffers the data in the LRFB, and control returns to Block 635. When the test at Block 677 has a positive response, Block 678 calls the DA's assimilate method in a similar manner to Block 679; however, an additional parameter is passed to that multiplexed DA, which is the dataBroker ID for the connection on which the data was received.

Block 685 of FIG. 6B is reached when neither the transmit method nor the assimilate method for the LRDB was called. Block 685 checks to see if the LRDB's "registerDataAssimilator" method was invoked. If this test has a negative response, then a method may have been invoked which is not pertinent to the novel processing of the present invention. Control is shown in FIG. 6B as returning to Block 615, although it will be obvious to one of ordinary skill in the art that additional processing may be added to FIG. 6 to handle the processing of such a method invocation.

When the test at Block 685 has a positive response, then a user (or other object) is calling this LRDB to register as the DA for this LRDB. As discussed above with reference to Block 635, the LRDB may have been buffering incoming data, awaiting registration of a DA that will receive the data. Blocks 686 through 689 check to see if there is any buffered data that is ready to send to this newly-registered DA, and if so, send it. Block 686 checks to see if there is a complete logical record ("LR") encapsulated in the UDB. If not, then the data is not yet ready to be delivered, so Block 689 appends the rest of the data in the UDB to the data being buffered in the LRFB. Control then returns to Block 615. Otherwise, when a complete LR is encapsulated in the UDB, Block 687 delivers this LR by calling the DA's assimilate method with a pointer to the logical record, and its size. While not shown in FIG. 6B, a test will be made before delivering the LR to determine if the LRDB is multiplexed, and if so, an additional parameter (the dataBroker ID) will also be passed when invoking the assimilate method.

Any number of complete logical records may have been buffered in the UDB, so the preferred embodiment implements a looping mechanism that continues the process of Blocks 686 through 689 until all the logical records have been delivered. Because the DA which is registered for the LRDB can change at any time, this looping process begins by checking at Block 688 to see if there is a registered DA. If not, control returns to Block 615: any remaining buffered logical records must wait until another DA registers itself at Block 685 with a subsequent call to the LRDB's "registerDataAssimilator" method. Otherwise, when the test at Block 688 has a positive response, control returns to Block 686 to check for another buffered logical record. This looping process will terminate when all the logical records have been delivered. In that situation, the test in Block 686 will have a negative response, returning control again to Block 615.

It will be obvious to one of ordinary skill in the art that the order of checking the events in Blocks 615, 630, and 685 may be changed without deviating from the inventive concepts of the present invention. Further, the "deRegisterDataAssimilator" method invocation and "multiplexed" method invocation have not been shown in FIG. 6. These will be implemented as additional choices to the choices shown in Block 615, 630, and 685. The processing of the "deRegisterDataAssimilator" method simply clears the knowledge in the LRDB of any DA that had been registered, which may involve setting a Blooolean flag such as "has-registered-DA" to false, or setting an identifier value for the registered DA to null, etc. The processing of the multiplexed method uses its single Boolean input parameter, and sets a corresponding flag or indicator maintained by the LRDB to this input value.

Figure 7A:
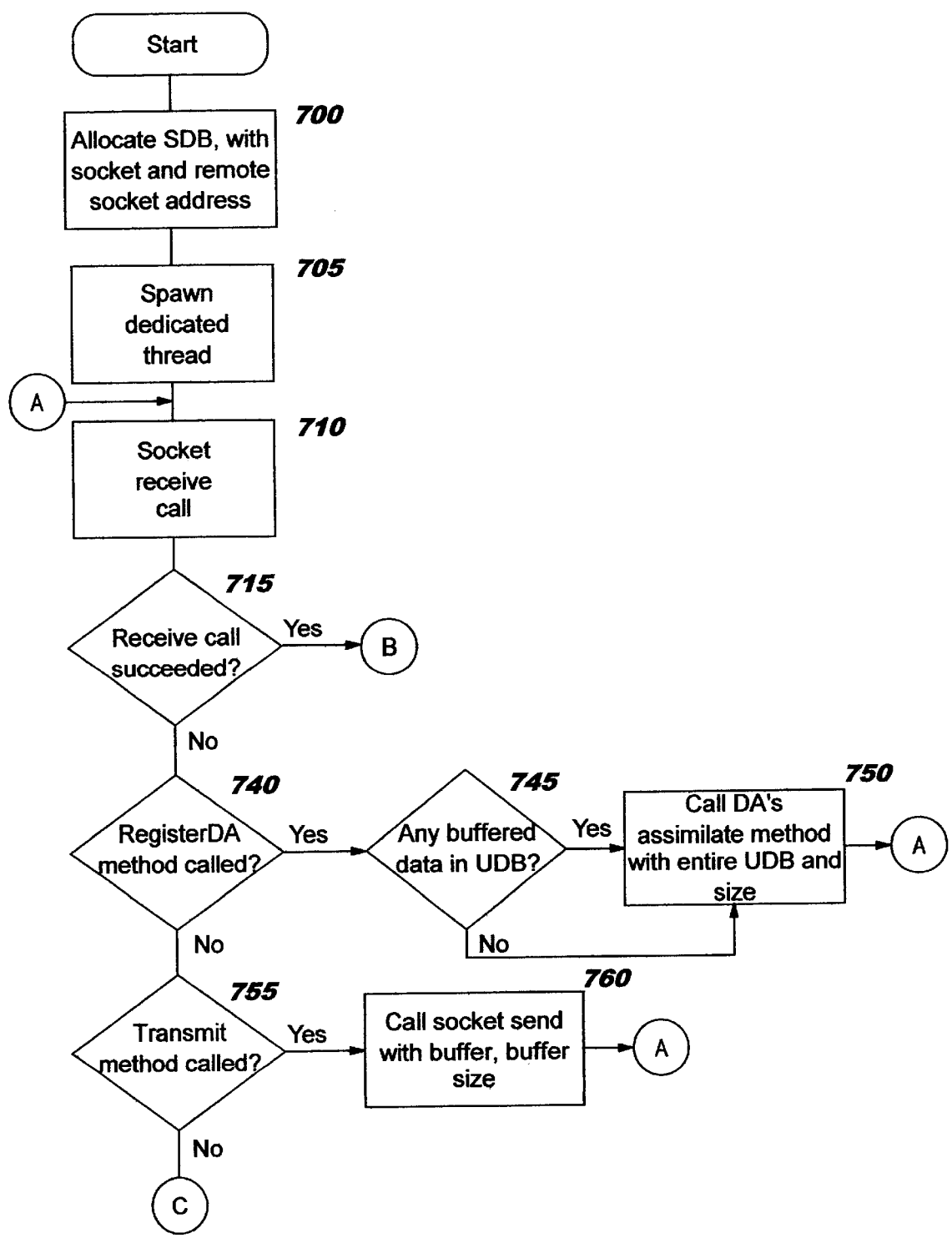
Figure 7B:
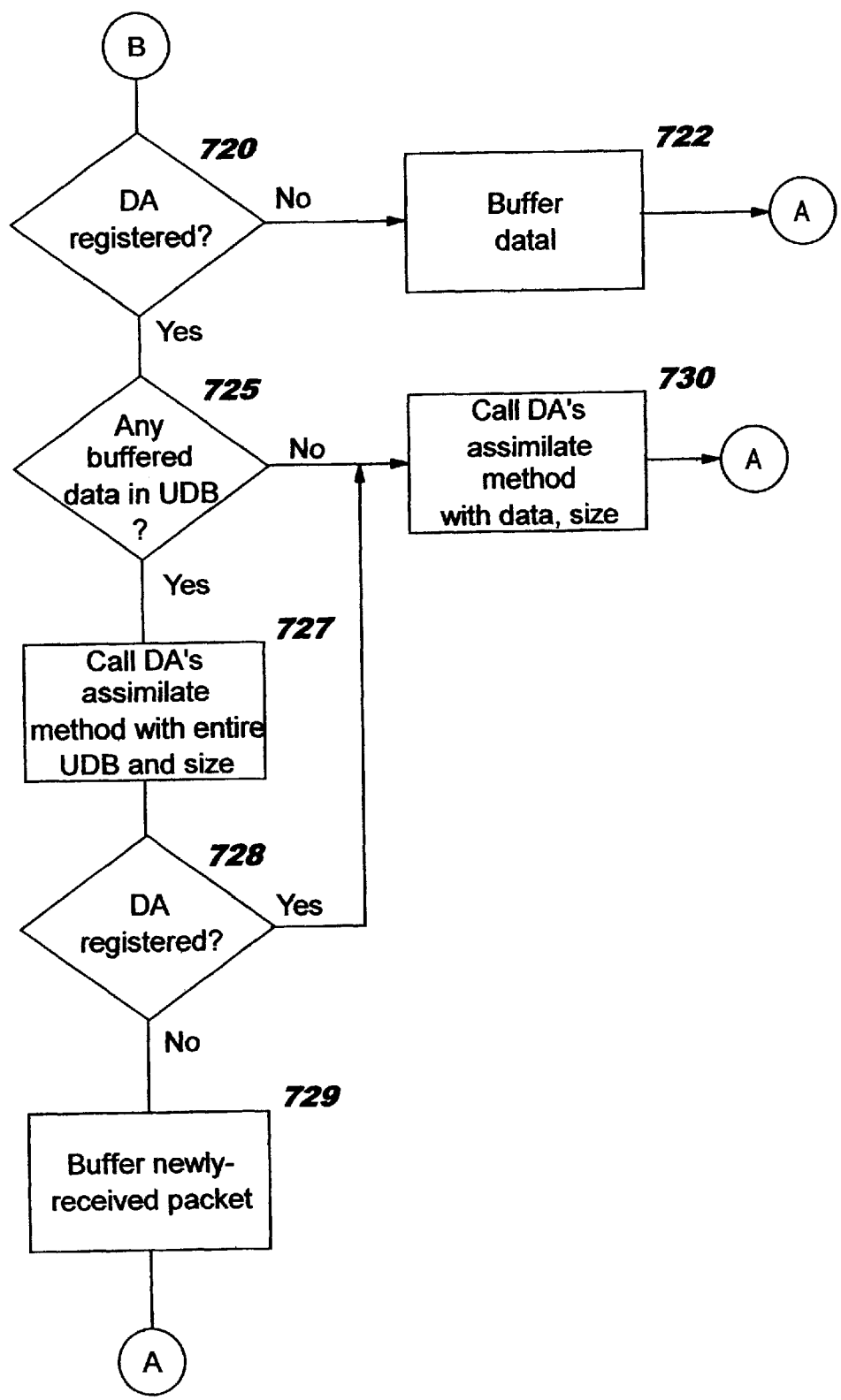
Figure 7C:
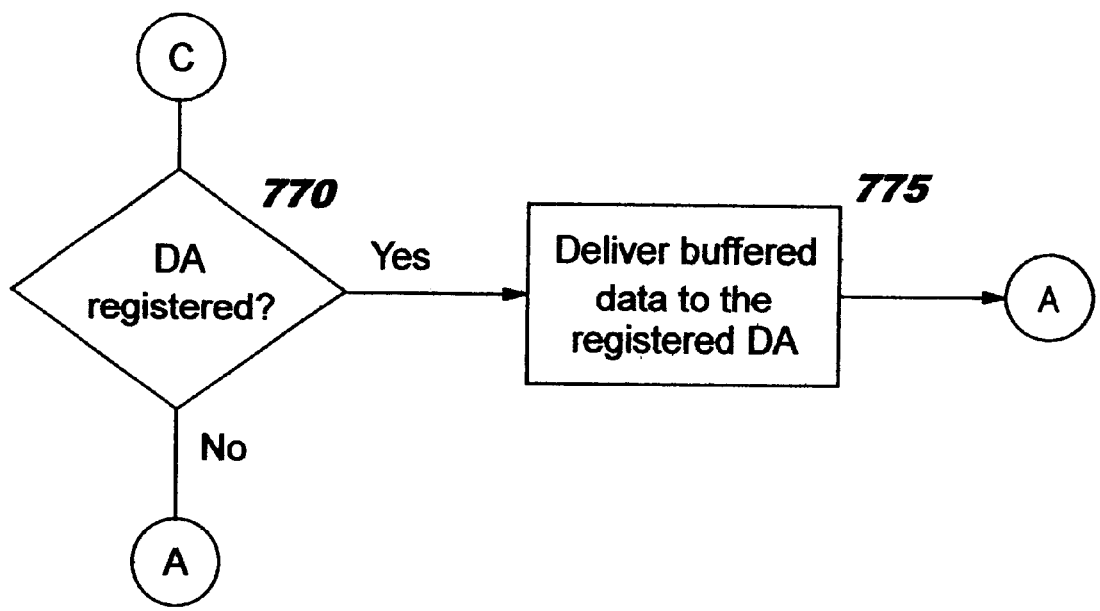

FIGS. 7A–7C depict the logic of a streamDataBroker, which is created upon invocation of the "constructor" function by a logicalRecordDataBroker or created by direct invocation from an instance of the FCTSL and FSTSL classes. At Block 700, an instance of the SDB class is allocated, using the input parameters specifying the socket and the remote socket address of the connection. At Block 705, a dedicated thread is spawned for this SDB instance. A socket blocking receive call is invoked at Block 710, using techniques which are known in the art and which do not form part of the present invention.

Block 715 tests to see whether the receive call invoked at Block 710 was successful. When this test has a positive response, Block 720 (see FIG. 7B) checks to see whether a dataAssimilator is registered for this SDB. If so, then Block 725 checks to see if there is any data buffered in the UDB. If the answer is "Yes", then all the buffered data is delivered to the registered DA by calling the DA's assimilate method at Block 727, passing a pointer to the UDB and its size. In addition, if this SDB is multiplexed, a dataBroker ID parameter will be passed on the invocation. (Since this SDB is processing data as a stream, the entire contents of the UDB are delivered, without regard to any boundaries such as the logical record boundaries respected by an LRDB.)

Block 728 tests to see if there is a registered DA. When there is, control transfers to Block 730. Otherwise, Block 729 buffers the newly-received packet from the packet buffer, by storing it in the UDB. Control will then return to Block 710 (see FIG. 7A).

Block 730 is reached when the answer to Block 725 is "No" (i.e. there is no undelivered data in the UDB that must be delivered), and also when the answer to Block 728 is "Yes". Block 730 calls the DA's assimilate method with the newly-received data in the packet buffer (which was received at Block 715) and its size (and also with a dataBroker ID, if this SDB is multiplexed), and control returns to Block 710 for issuance of the next blocking receive call.

Block 722 is reached when there was no dataAssimilator registered for this dataBroker when the test at Block 720 was made. In that case, Block 722 buffers the received data stream from the packet buffer by storing it in the UDB, and returns control to Block 710.

Control reaches Block 740 when the receive call of Block 710 was not successful. Block 740 checks to see if the registerDataAssimilator ("registerDA", as shown in FIG. 7A) method was called. If so, then Block 745 asks if there is any buffered data in the UDB. If there is, Block 750 delivers it to this registering DA by calling the assimilate method with the entire UDB and its size. While not shown in FIG. 7A, a test will be made before delivering the UDB to determine if the SDB is multiplexed, and if so, an additional parameter (the dataBroker ID) will also be passed when invoking the assimilate method. Control returns to Block 710 after completing Block 750, and also following a negative response at Block 745.

Block 755 is reached when Blocks 715 and 740 both had negative responses. Here, a test is made to determine if the transmit method of the SDB was called. If not, control transfers to Block 770 of FIG. 7C. Otherwise, Block 760 processes the transmit request by calling the socket send with the buffer and its size, both of which were received as input parameters from the transmit invocation.

Control reaches Block 770 when the blocking receive call of Block 710 was not unblocked due to a successful receive, a DA registering itself, nor the transmit method being called. FIG. 7 shows only these events and connection termination (processed by Blocks 770 and 775, discussed below) as being the events which awaken the blocked SDB. However, the "deRegisterDataAssimilator" and "multiplexed" method invocations may be received as alternatives to Blocks 715, 740, 755, and 770, and function identically to the description given above for these methods with respect to FIG. 6. Logic may be added to FIG. 7 to handle processing of other types of notifications that are beyond the scope of the present invention (and the ordering of the choices of Blocks 715, 740, 755, and 770 may be changed), without deviating from the inventive concepts defined herein.

A test is made at Block 770 to see whether there is a registered dataAssimilator for this dataBroker. If not, then there is no user to deliver the connection terminated message to, so control returns to Block 710. Otherwise, Block 775 delivers any data that has been buffered to the registered DA by calling the DA's assimilate method, passing a pointer to the UDB and its size. Again, if this SDB is multiplexed, an additional parameter will be passed, identifying the dataBroker. Following completion of Block 775, control returns to Block 710.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

I claim:

1. In a computing environment having a connection to a network, computer readable code for encapsulating communications socket functionality in a lightweight uniform communications object model, said computer readable code being readable by a computer system in the environment and comprising:

computer readable code encapsulating functions for building a communications socket;

computer readable code encapsulating functions on logical record-oriented data of the communications socket;

computer readable code encapsulating functions on stream-oriented data of the communications socket;

computer readable code for providing an application programming interface ("API") for initializing communications socket communications, wherein an invocation of the initializing API invokes one of the encapsulated functions for building the communications socket;

computer readable code for providing an API for receiving data wherein:

an invocation of the receive data API invokes one of the encapsulated functions on logical record-oriented data to deliver a logical record to an invoker if a receiver of the invocation implements logical record-oriented functions; or the invocation of the receive data API invokes one of the encapsulated functions on stream-oriented data to deliver buffered data to the invoker if the receiver of the invocation implements stream-oriented functions; and computer readable code for providing an API for transmitting data, wherein:

an invocation of the transmit data API invokes one of the encapsulated functions on logical record-oriented data to deliver a logical record from an invoker if a receiver of the invocation implements logical record-oriented functions; or the invocation of the transmit data API invokes one of the encapsulated functions on stream-oriented data to deliver buffered data from the invoker if the receiver of the invocation implements stream-oriented functions;

wherein the encapsulated functions are functionally independent of a system, language, and device from which the APIs may be invoked.

2. The computer readable code according to claim 1, wherein the encapsulated functions for building the communications socket comprise (1) functions for building logical record-oriented communications sockets for clients and for building logical record-oriented communications sockets for servers, and (2) functions for building stream-oriented communications sockets for clients and for building stream-oriented communications sockets for servers.

3. The computer readable code according to claim 1, further comprising computer readable code encapsulating functions for creating one or more data broker assimilators, wherein each of the data broker assimilators owns, at least temporarily, one of the built communications sockets.

4. The computer readable code according to claim 1, further comprising computer readable code encapsulating functions for sending notification of incoming data from the communications socket and for sending notification of communications socket termination.

5. The computer readable code according to claim 1, further comprising computer readable code encapsulating functions for sending notification of incoming data which arrives on one of a plurality of communications sockets and for sending notification of termination of one of the plurality of communications sockets.

6. A system for encapsulating communications socket functionality in a lightweight uniform communications object model in a computing environment having a connection to a network, comprising:

means for encapsulating functions for building a communications socket;

means for encapsulating functions on logical record-oriented data of the communications socket;

means for encapsulating functions on stream-oriented data of the communications socket;

means for providing an application programming interface ("API") for initializing communications socket communications, wherein an invocation of the initializing API invokes one of the encapsulated functions for building the communications socket;

means for providing an API for receiving data, wherein:

an invocation of the receive data API invokes one of the encapsulated functions on logical record-oriented data to deliver a logical record to an invoker if a receiver of the invocation implements logical record-oriented functions; or the invocation of the receive data API invokes one of the encapsulated functions on stream-oriented data to deliver buffered data to the invoker if the receiver of the invocation implements stream-oriented functions; and means for providing an API for transmitting data, wherein:

an invocation of the transmit data API invokes one of the encapsulated functions on logical record-oriented data to deliver a logical record from an invoker if a receiver of the invocation implements logical record-oriented functions; or the invocation of the transmit data API invokes one of the encapsulated functions on stream-oriented data to deliver buffered data from the invoker if the receiver of the invocation implements stream-oriented functions;

wherein the encapsulated functions are functionally independent of a system, language, and device from which the APIs may be invoked.

7. The system according to claim 6, wherein the encapsulated functions for building the communications socket comprise (1) functions for building logical record-oriented communications sockets for clients and for building logical record-oriented communications sockets for servers, and (2) functions for building stream-oriented communications sockets for clients and for building stream-oriented communications sockets for servers.

8. The system according to claim 6, further comprising means or encapsulating functions for creating one or more data broker assimilators, wherein each of the data broker assimilators owns, at least temporarily, one of the built communications sockets.

9. The system according to claim 6, further comprising means for encapsulating functions for sending notification of incoming data from the communications socket and for sending notification of communications socket termination.

10. The system according to claim 6, further comprising means for encapsulating functions for sending notification of incoming data which arrives on one of a plurality of communications sockets and for sending notification of termination of one of the plurality of communications sockets.

11. A method for encapsulating communications socket functionality in a lightweight uniform communications object model in a computing environment having a connection to a network, comprising steps of:

encapsulating functions for building a communications socket;

encapsulating functions on logical record-oriented data of the communications socket;

encapsulating functions on stream-oriented data of the communications socket;

providing an application programming interface ("API") for initializing communications socket communications, wherein an invocation of the initializing APT invokes one of the encapsulated functions for building the communications socket;

providing an API for receiving data, wherein:

an invocation of the receive data API invokes one of the encapsulated functions on logical record-oriented data to deliver a logical record to an invoker if a receiver of the invocation implements logical record-oriented functions; or the invocation of the receive data API invokes one of the encapsulated functions on stream-oriented data to deliver buffered data to the invoker if the receiver of the invocation implements stream-oriented functions; and providing an API for transmitting data, wherein:
an invocation of the transmit data API invokes one of the encapsulated functions on logical record-oriented data to deliver a logical record from an invoker if a receiver of the invocation implements logical record-oriented functions; or
the invocation of the transmit data API invokes one of the encapsulated functions on stream-oriented data to deliver buffered data from the invoker if the receiver of the invocation implements stream-oriented functions;
wherein the encapsulated functions are functionally independent of a system, language, and device from which the APIs may be invoked.

12. The method according to claim 11, wherein the encapsulated functions for building the communications socket comprise (1) functions for building logical record-oriented communications sockets for clients and for building logical record-oriented communications socket for servers, and (2) functions for building stream-oriented communications sockets for clients and for building stream-oriented communications sockets for servers.

13. The method according to claim 11, Her comprising the step of creating one or more data broker assimilators, wherein each of said data broker assimilators owns, at least temporarily, one of the built communications sockets.

14. The method according to claim 11, further comprising the step of encapsulating functions for sending notification of incoming data from the communications socket and for sending notification of communications socket termination.

15. The method according to claim 11, further comprising the step of encapsulating functions for sending notification of incoming data which arrives on one of a plurality of communications sockets and for sending notification of termination of one of the plurality of communications sockets.

* * * * *